(12) United States Patent
Yamaguchi et al.

(10) Patent No.: US 7,880,543 B2
(45) Date of Patent: Feb. 1, 2011

(54) DATA TRANSMITTING CIRCUIT AND TRANSMITTING METHOD

(75) Inventors: Hisakatsu Yamaguchi, Kawasaki (JP);
Yoshiyasu Doi, Kawasaki (JP);
Hirotaka Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 12/392,140

(22) Filed: Feb. 25, 2009

(65) Prior Publication Data
US 2009/0225900 A1 Sep. 10, 2009

Related U.S. Application Data

(63) Continuation of application No. PCT/JP2006/317261, filed on Aug. 31, 2006.

(51) Int. Cl.
*H03F 1/26* (2006.01)
(52) U.S. Cl. .................. 330/149; 330/85; 330/103; 330/107; 333/24.2; 333/154; 333/248
(58) Field of Classification Search ............ 330/85, 330/103, 107, 149; 333/24.2, 248, 154
See application file for complete search history.

(56) References Cited

U.S. PATENT DOCUMENTS

| | | | | |
|---|---|---|---|---|
| 3,638,134 A * | 1/1972 | Beurrier et al. | ............. | 330/149 |
| 5,469,114 A * | 11/1995 | Saxena | ..................... | 330/107 |
| 5,943,162 A * | 8/1999 | Kosaka et al. | ......... | 359/341.31 |
| 5,987,308 A * | 11/1999 | Ookita | ...................... | 455/83 |
| 6,121,840 A * | 9/2000 | Sakusabe | .................... | 330/277 |
| 6,163,221 A * | 12/2000 | Matsuno | ..................... | 330/302 |
| 6,181,467 B1 * | 1/2001 | Jung et al. | ............. | 359/341.31 |
| 6,747,791 B1 * | 6/2004 | Wang et al. | ............... | 359/337.1 |
| 6,968,163 B2 * | 11/2005 | Kuechler et al. | ............ | 455/126 |
| 7,129,804 B2 * | 10/2006 | Hosoya | ........................ | 333/33 |
| 7,190,934 B2 * | 3/2007 | Kataoka et al. | ............. | 455/126 |
| 7,400,200 B2 * | 7/2008 | Fujii et al. | .................. | 330/295 |

FOREIGN PATENT DOCUMENTS

| | | |
|---|---|---|
| JP | 2003-524337 A | 8/2003 |
| JP | 2004-363861 A | 12/2004 |
| WO | WO-01/63868 | 8/2001 |

OTHER PUBLICATIONS

Nagendra Krishnapura et al., "A 5Gb/s NRZ Transceiver with Adaptive Equalization for Backplane Transmission", IEEE International Solid-State Circuits Conference, Feb. 7, 2005, p. 60, 61, 585, vol. 1, Digest of Technical Papers.
Jan W.M. Bergmans, "Digital Baseband Transmission and Recording", Philips Research Eindhoven, The Netherlands, 1996, Chapter 6 p. 265-300, Kluwer Academic Publishers.
"Japanese Office Action", mailed by JPO and corresponding to Japanese application No. 2008-531943 on Nov. 2, 2010, with partial English translation.

* cited by examiner

*Primary Examiner*—Linh V Nguyen
(74) *Attorney, Agent, or Firm*—Fujitsu Patent Center

(57) ABSTRACT

A data transmitting circuit includes a reflection suppressive component generating circuit for generating a reflection suppressive component for suppressing the reflection caused by the discontinuity in the characteristic impedance on a transmission line, and a data output circuit for amplifying the reflection suppressive component and the data to be currently transmitted to a receiving side and outputting them to the transmission line.

7 Claims, 21 Drawing Sheets

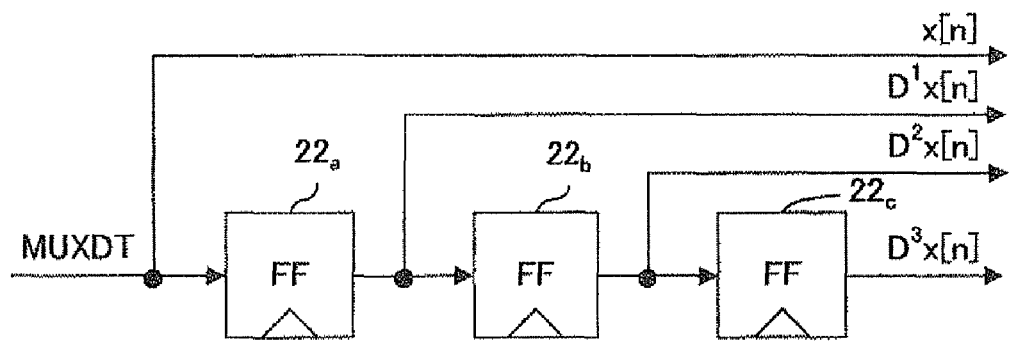
F I G. 9

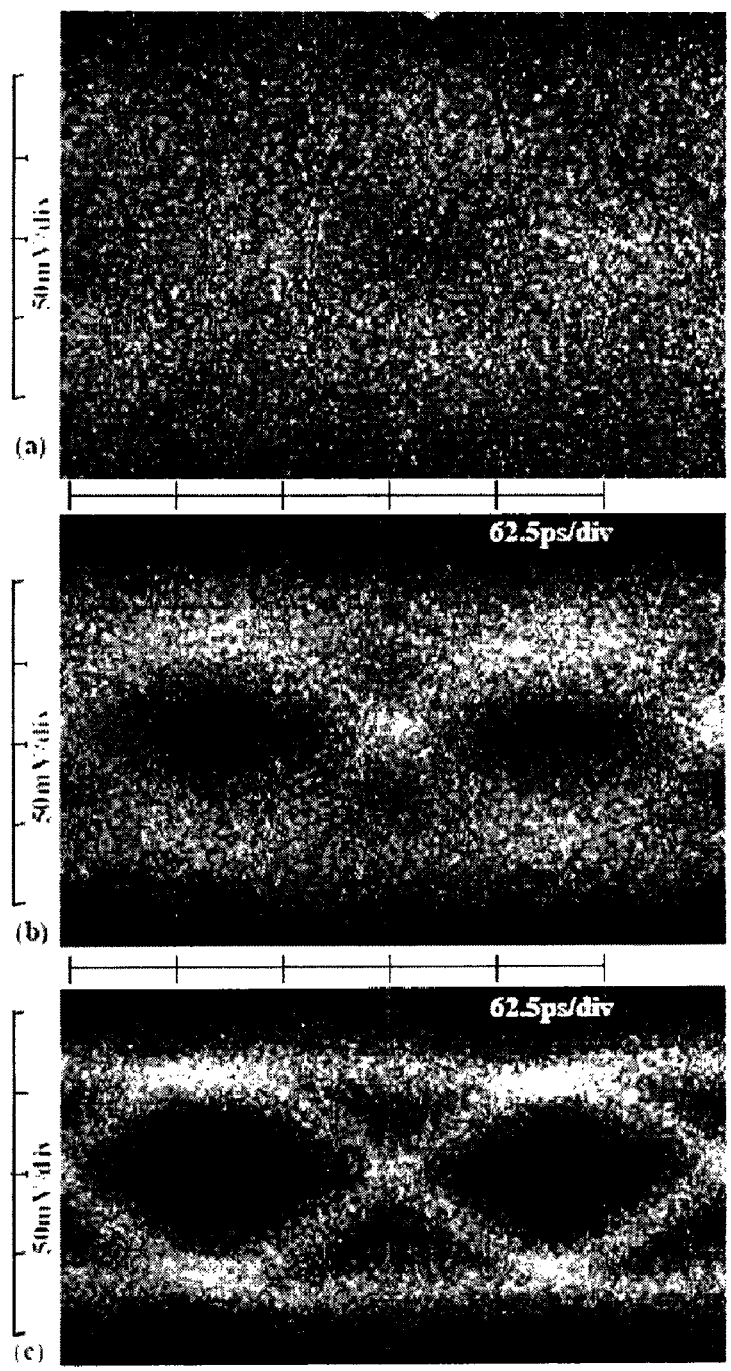
F I G. 2 0

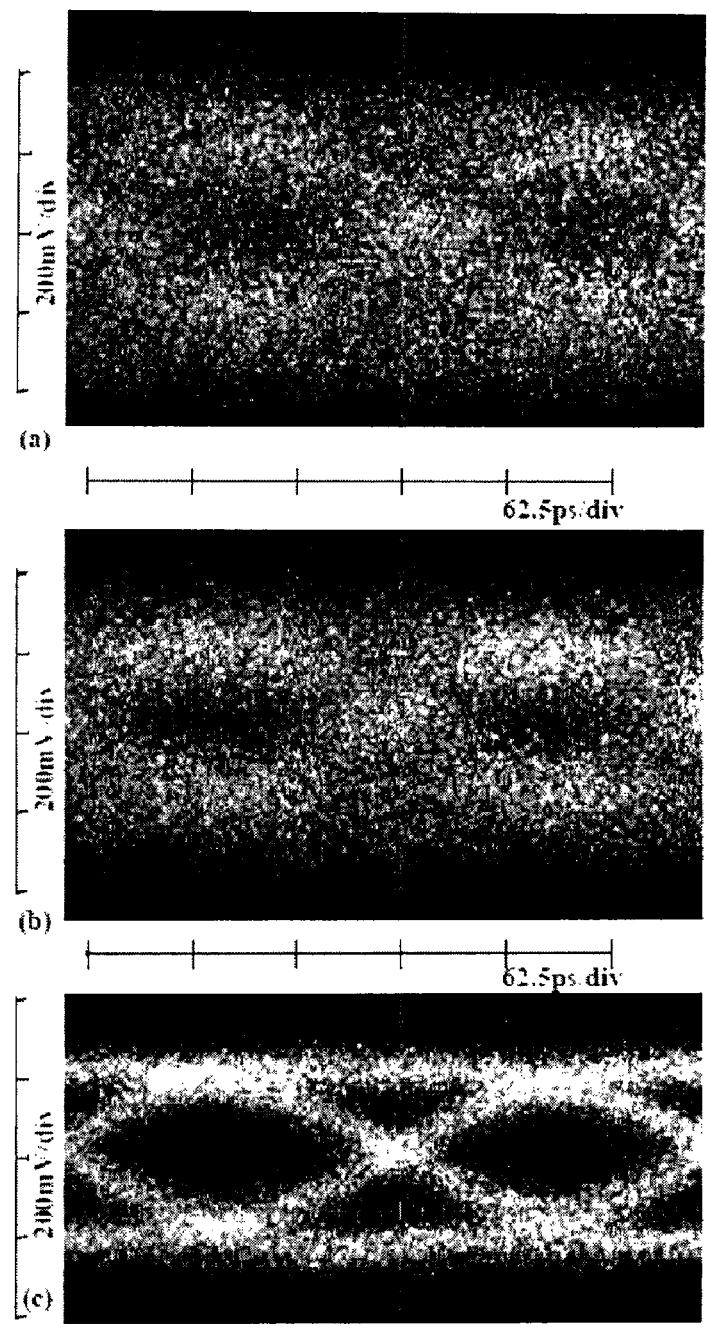
F I G. 2 1

DATA TRANSMITTING CIRCUIT AND TRANSMITTING METHOD

FIELD

The present application relates to a data transmitting circuit and a transmitting method.

BACKGROUND

Generally, when performing data transmission/reception through a transmission line with a large loss, and through a transmission line and a cable having a discontinuity in its characteristic impedance, an equalizing circuit (equalizer) for compensating for the degradation of a signal waveform due to the loss in the transmission line and the discontinuity characteristic impedance. The loss in the transmission line generates an ISI (inter-symbol interference) component in the reception waveform, and the discontinuity in the characteristic impedance generates a reflection component.

FIG. 1 is a conventional example of a data transmission/reception system through a backplane. While an output waveform from a transmitting circuit and an input waveform to a receiving circuit are illustrated, a distortion is generated in the input waveform to the receiving circuit due to an ISI component and a reflection component.

FIG. 2 is a configuration block diagram of a conventional example of a receiving circuit in a data transmission/reception system. In the drawing, transmission data transmitted from a transmitting circuit (Tx) 100 through a transmission line 101 is provided as input data RX_IN to a decision feedback equalizer (DFE) 105 in a receiving circuit (Rx) 102. The DFE 105 is an equalizing circuit corresponding to an IIR (infinite impulse response) filter as a typical equalizing circuit. Output RDT from the DFE 105 is converted from serial data to parallel data by a demultiplexer 106, and is output from the receiving circuit 102 as output data RX_OUT. The DFE 105 constitutes the IIR filter using output from a decision circuit that decides the logical value of an input signal, which is to be described in detail later.

A clock recovery unit 107 in the receiving circuit 102 in FIG. 2 detects temporal fluctuation in the output data, and outputs the result of the detection to a clock phase adjustment circuit 108 as a phase code. The clock phase adjustment circuit 108 adjusts the phase of a clock, and provides the DFE 105 with the adjusted clock for enabling the sampling at the middle position of the data in terms of time. A frequency dividing circuit 109 generates a clock required in the case of converting, for example, 10 GHz serial data into 330 MHz parallel data using the demultiplexer 106.

FIG. 3 is a configuration example of the decision feedback equalizer (DFE) 105 in FIG. 2. In the drawing, basically, the DFE is composed of a decision circuit 111 composed of a flip flop (FF); FF$112_1$ to $112_{n-1}$ connected subsequently in series, their quantity being n−1; amplifiers $114_1$ to $114_n$ that amplify the output of all FFs including the decision circuit 111; a subtractor 115 that subtracts the outputs of all amplifiers $114_1$ through $114_n$ from the input data RX_IN input from the transmission line 101.

The operation of the DFE in FIG. 3 is described using FIG. 4 and FIG. 5. FIG. 4 is a diagram illustrating an example of a pulse response measurement system in a transmission line. In the drawing, a single pulse, i.e., a unit pulse is transmitted from the transmitting circuit 100 through the transmission line 101, and the response waveform is measured by a monitor 120 disposed in the receiving circuit 102. Here, the unit pulse output from the transmitting circuit 100 has a height corresponding to data "1", and its width is one unit interval. The unit interval (UI) has a length corresponding to one cycle of a clock corresponding to the data transmission rate, and if the clock frequency is 5 GHz, one unit interval (UI) is 200 ps. In the following descriptions, the response at the input side in the receiving circuit 102 in the case of inputting the unit pulse described above to the transmission line 101 is referred to as "unit pulse response", for simplification.

FIG. 5 is an example of the unit pulse response. The drawing illustrates the waveform of the unit pulse response in accordance with the time in units of unit intervals (UI), while assuming the input time of the unit pulse to the transmission line 101 to be time 0. The height $a_0$ of the first peak is the original response component with respect to the input unit pulse; components $a_1$ through $a_3$ near the component $a_0$ are the ISI components described above; and components $a_{n-1}$, $a_n$, $a_{n+1}$ . . . in distant positions from the peak $a_0$ are the reflection components.

In FIG. 3, the decision circuit 111 decides the logical value of input signal data corresponding to the unit pulse response; outputs data H or L as the result; the data is shifted by one clock in each of the subsequent FF$112_1$ through $112_{n-1}$; the outputs from all FFs are multiplied with amplification degrees $a_1$ through $a_n$ of the amplifiers $114_1$ through $114_n$; and the results of the multiplications are subtracted from the input data RX_IN by the subtractor 115. The amplification rates $a_1$ through $a_n$ are called tap coefficients and correspond to the values of the respective components in FIG. 5. In other words, the DFE 105 has amplitude values in accordance with an interference component as tap coefficients, and subtracts the interference component due to a previous input signal from the current input signal, of which further details are described in the following document.

N. Krishnapura et al. "A 5 Gb/s NRZ Transceiver with Adaptive Equalization for Backplane Transmission", *IEEE Int. Solid-State Circuits Conf., pp.* 60-61, 585, February, 2005

Jan W. M. Bergmans, "DIGITAL BASEBAND TRANSMISSION AND RECORDING", *Kluwer Academic Publishers*, Chap. 6, pp.265-300, 1996.

The IIR filter constituting the decision feedback equalizer as described above is conventionally disposed in the receiving circuit side. The IIR filter is effective for eliminating the ISI component caused by a loss in a transmission line and a cable, and for eliminating the reflection component due to a discontinuity in the characteristic impedance (mismatching in the termination resistance) at the input side of the receiving circuit. However, in a case such as when the point of discontinuity in the characteristic impedance exists along a transmission and a cable, the reflection component at the point of discontinuity is transmitted not only to the receiving circuit side but also to the transmitting circuit side. Although it is effective to eliminate, at the transmitting circuit side, the reflection component transmitted to the transmitting circuit side, there has been a problem that the reflection component may not be eliminated at the transmitting circuit side, since the transmitting circuit side is conventionally not equipped with an IIR filter.

In addition, there has been a general idea that it is more advantageous to dispose the IIR filter in the receiving circuit side. As described above, the receiving circuit converts, and outputs, input serial data into parallel data, while the flip flops constituting the demultiplexer for that purpose hold not only the current input data but also data for past several bits on the basis of the input data. Therefore, by composing the IIR filter using the output data from these flip flops, an equalizing circuit capable of suppressing the reflection component may be implemented while keeping the number of additional circuit elements to the minimum.

However, in response to the recent needs from users, a receiving circuit that is compatible with the configurations of the transmission line and cable in various forms may be required. For this reason, the development of an adaptive equalizing circuit that automatically determines the tap coefficients for the IIR filter is well underway. A control circuit to realize the algorithm for calculating the tap coefficients included in the adaptive equalizing circuit is generally large in size and there has been a problem that it is very difficult to include the control circuit for the adaptive equalization within the receiving circuit. By contrast, compared to the receiving circuit side, the transmitting circuit side is assumed to have some margins for circuit expansion to include the IIR filter.

In addition, at the receiving circuit side, there is a case of receiving data having a high bit error rate, and in this case, there is a possibility that the use of the IIR filter causes further degradation of the input signal waveform, because the tap coefficients are calculated on the basis of the wrong logic data. On the other hand, the logic data held at the transmitting circuit side is assumed to be always correct, and it is expected that by equipping the transmitting circuit side with the IIR filter, the calculation of the tap coefficient becomes accurate, and the reflection component is always suppressed accurately.

SUMMARY

According to an aspect of embodiments, a transmitting circuit includes a reflection suppression component generating circuit generating a reflection suppression component for suppressing a reflection caused by a discontinuity in a characteristic impedance existing in a transmission line coupled to the transmitting circuit, and a data output circuit amplifying and outputting, to the transmission line, the reflection suppression component and data to be transmitted to a receiving side coupled to the transmission line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 depicts a configuration block diagram of the main data path circuit in FIG. 8;

FIG. 20 depicts an example (1) of eye-pattern waveforms at the input side of a transmitting circuit;

FIG. 21 depicts an example (2) of eye-pattern waveforms at the input side of a transmitting circuit.

DESCRIPTION OF EMBODIMENTS

Figure 6:
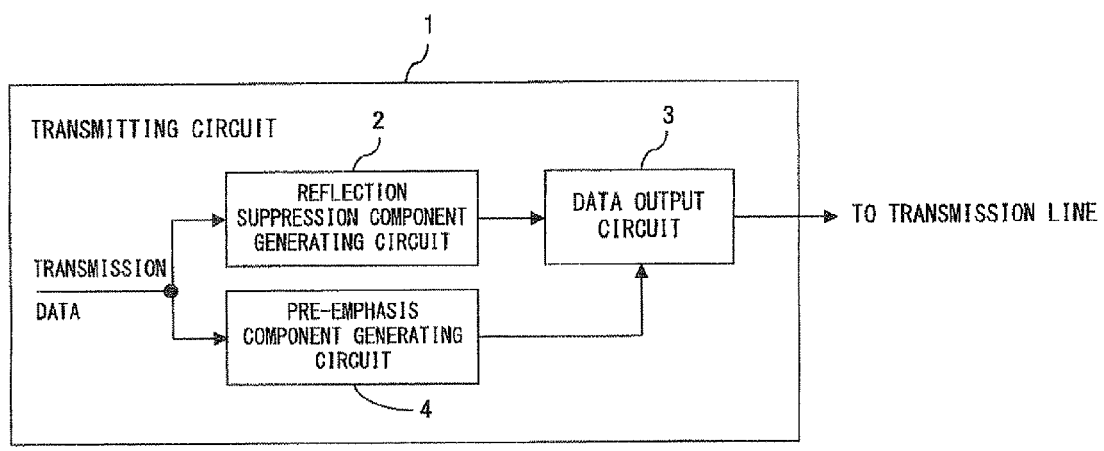
FIG. 6 depicts a configuration block diagram of a data transmitting circuit according to the embodiments.

FIG. 6 is a configuration block diagram of a data transmitting circuit according to the embodiments. In the drawing, a data transmitting circuit 1 includes a reflection suppression component generating circuit 2, a data output circuit 3 and a pre-emphasis component generating circuit 4.

The reflection suppression component generating circuit 2 is a reflection data path circuit in the embodiment described later, which is composed of, for example, a plurality of flip flops and selectors, and delays previous transmission data in term of time to output as a reflection suppression component for suppressing the reflection due to a discontinuity in the characteristic impedance existing in a transmission line.

The data output circuit 3 is for example a output driver, which amplifies data to be output to the receiving side at the current moment using, for example, a main driver; amplifies the reflection suppression component using a sub driver for reflection cancellation; add the result of the amplifications in terms of electric current and to output to the transmission.

In addition, the pre-emphasis component generating circuit 4 is for example a main data path circuit that generates a pre-emphasis component for suppressing inter-symbol interference due to a loss in a transmission line and the like, which is composed of, for example, a plurality of flip flops, and delays previous transmission data in terms of time to output in addition to the data to be transmitted to the receiving side at the current moment. In accordance with the output, the data output circuit 3 amplifies the current output data using the main driver in its inside as described above; amplifies the data delayed in terms of time using the sub driver for pre-emphasis; add them in terms of time with the result of the amplification of the reflection component, to output to the transmission line.

Figure 7:
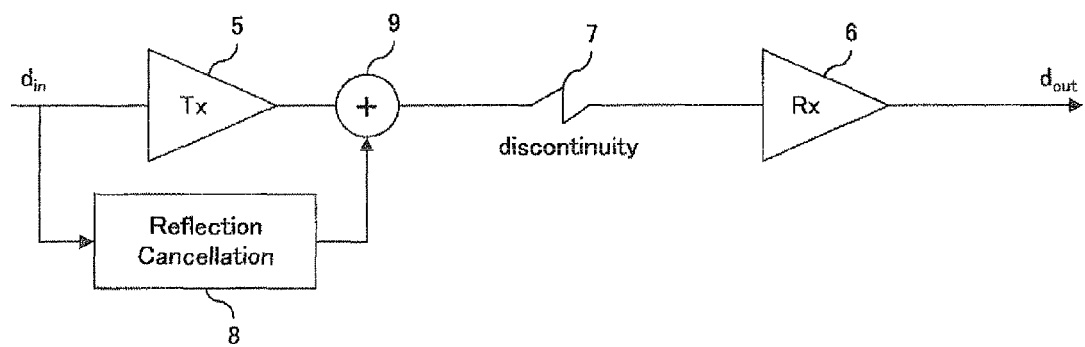
FIG. 7 depicts a basic illustration of a data transmitting/receiving system according to the embodiments.

FIG. 7 is a basic configuration diagram of a data transmitting/receiving system using a reflection component suppressing system according to the embodiments. In the drawing, while a discontinuity 7 of the characteristic impedance exists between a transmitting circuit (Tx) 5 and a receiving circuit (Rx) 6, in the embodiments, the transmitting side is provided with a reflection cancellation 8 for eliminating the reflection component, and the reflection component due to the discontinuity 7, i.e., the reflection component from the point of discontinuity along a transmission line and a cable may be eliminated effectively, by adding, using an adder 9, and outputting, to the transmission line, the outputs from the transmitting circuit 5 and the reflection cancellation 8.

This makes it may be possible to prevent the problem that the circuit size increases at the receiving circuit 6 side, and also gives a large degree of freedom in the design of the receiving circuit 6. In addition, the logic value of data used for the transmission at the transmitting circuit 5 side is always correct, and results of the calculation performed on the basis of the data in the IIR filter for the reflection cancellation 8 are always valid as well, making it may be possible to perform the reflection suppression accurately.

Figure 8:
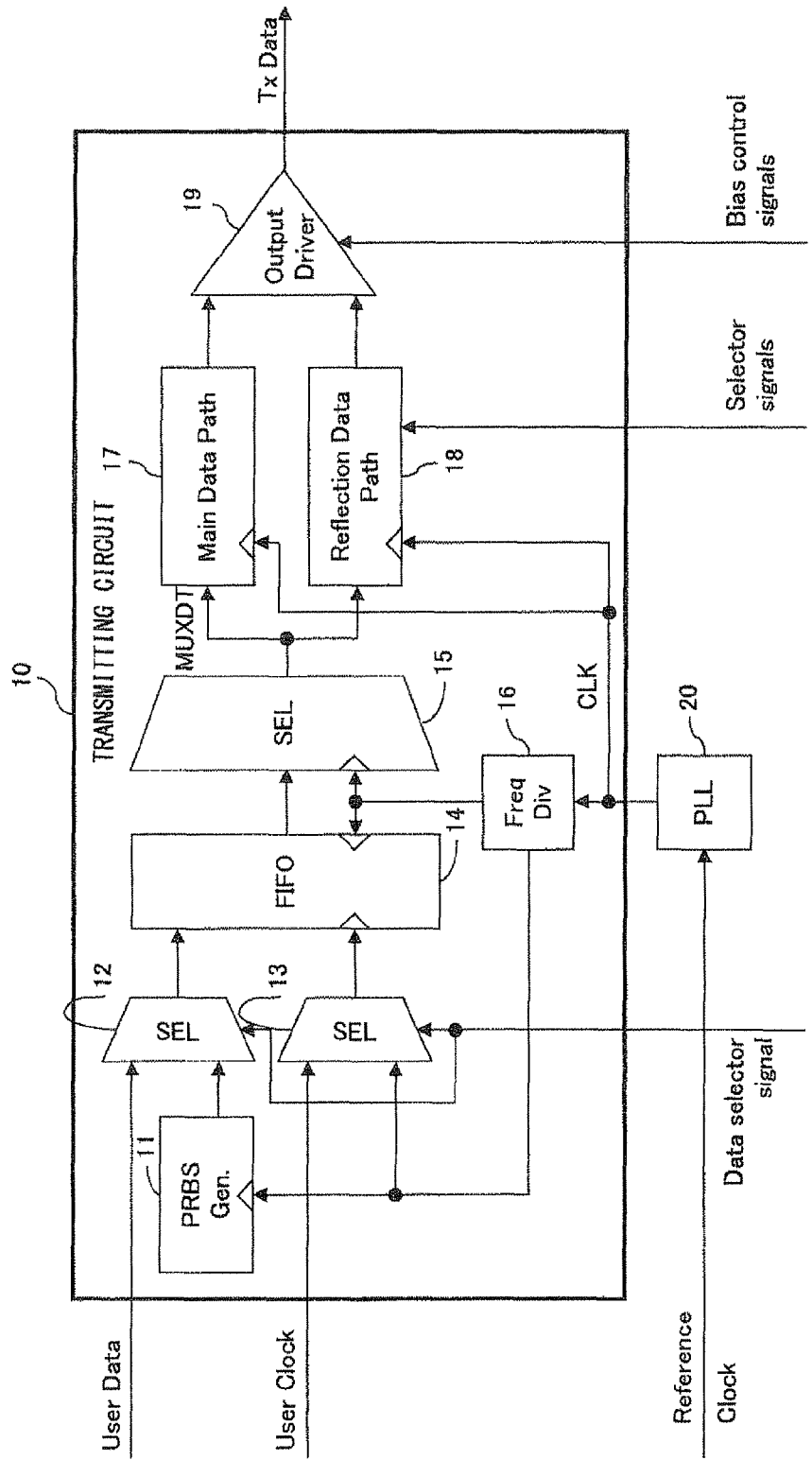
FIG. 8 depicts a configuration block diagram of a transmitting circuit according to the first embodiment.

FIG. 8 is a configuration block diagram of a transmitting circuit according to the first embodiment. In the drawing, a transmitting circuit 10 has a pseudo-random bit sequence (PRBS) data pattern generating circuit 11 that generates a test false signal, two selectors 12, 13, a first-in first-out memory (FIFO) 14, a multiplexer 15, a frequency dividing circuit 16, a main data path circuit 17, a reflection data path circuit 18 and an output driver 19, and the frequency dividing circuit 16 is coupled to, for example a PLL circuit 20 outside the transmitting circuit 10.

The selector 12 selects either of an output from the PRBS data pattern generating circuit 11 or user data provided from outside as parallel data for transmission. The PRBS data pattern generating circuit 11 operates in synchronization with a low-speed clock as a result of the frequency division of a clock generated by the PLL circuit 20, performed the frequency dividing circuit 16.

The selector 13 selects and outputs either of a user clock as clock synchronized with user data provided to the selector 12, or the low-speed clock output from the frequency dividing circuit 16. The selection control for the selector 12 and the selector 13 is controlled by data selector signals provided from outside.

The outputs from the selector 12 and the selector 13 are provided to the first-in first-out memory (FIFO) 14. The FIFO 14 is for clock handoff, and outputs, to the multiplexer 15, user data provided from outside, or test data output from the PRBS data pattern generating circuit 11, in synchronization with the low-speed clock output from the frequency dividing circuit 16. The data (MUXDT) serialized by the multiplexer 15 is provided to the main data path circuit 17 and the reflection data path circuit 18.

The main data path circuit 17 is composed of a plurality of flip flops that delay the serial data MUXDT in units of one clock as described later, and realizes, with the output driver, the pre-emphasis function as one of the functions of the equalizing circuit. The pre-emphasis function emphasizes a high-frequency component included in data by cancelling the inter-symbol interference (ISI) component described above, and makes the rising of the peak of the data amplitude $a_0$ illustrated in FIG. 5 steeper.

The reflection data path circuit 18 is composed of a plurality of selectors and a large number of flip flops as described later, and constitutes, with the output driver 19, an IIR filter for eliminating the reflection component from a point of discontinuity in the impedance in a transmission line and a cable.

The output driver 19 outputs transmission (Tx) data to the transmission line, and has a main driver corresponding transmission data at the current time output from the main data path circuit 17, and a plurality of sub drivers corresponding to a plurality of delay signal components output from the main data path circuit 17 and the reflection data path circuit 18.

FIG. 9 illustrates the configuration of the main data path circuit 17 in FIG. 8. The main data path circuit 17 is composed of flip flops (FF) $22_a$ through $22_c$ in three stages, to which data MUXDT output from the multiplexer 15 in FIG. 8 is input. The three FF $22_a$ through $22_c$ take in input data in synchronization with the rising edge of a high-speed clock output from the PLL circuit 20. The frequency of the high-speed clock CLS corresponds to, for example, the output data rate of the transmitting circuit 10, and if the rate of output Tx data is 5 Gb/s, the frequency of the CLK is 5 GHz.

Figure 10:
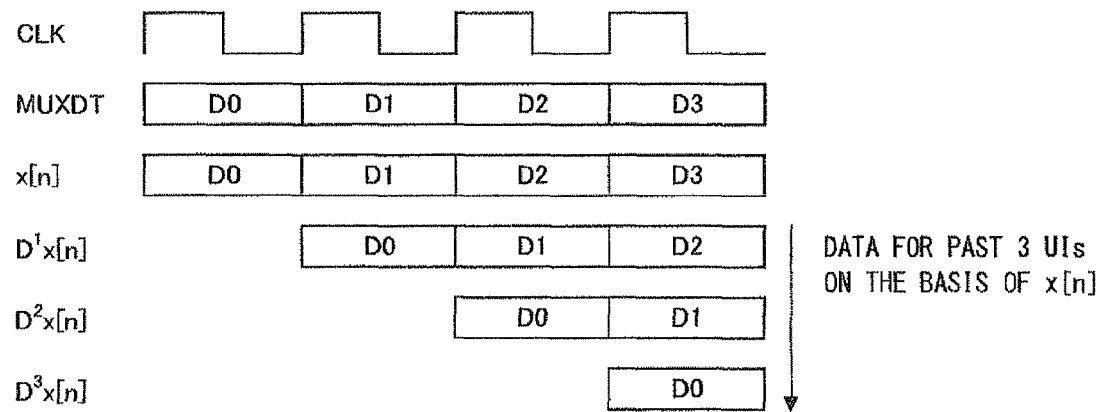
FIG. 10 depicts a timing chart of an operation example of the circuit in FIG. 9.

The operation of the main data path circuit in FIG. 9 is described using the timing chart in FIG. 10. Data MUXDT output from the multiplexor 15 is used as transmission data x[n] of the current time without change. Data output from $FF22_a$ is $D^1x[n]$ that is the transmission data of the current time with one clock delay (D), and in the similar manner, the $FF22_b$ outputs $D^2x[n]$; the $FF22_c$ outputs $D^3x[n]$; and the main data path circuit 17 outputs data for the past three clocks on the basis of x[n], i.e., data for the past three UIs, with the transmission data x[n] of the current time.

Figure 11:
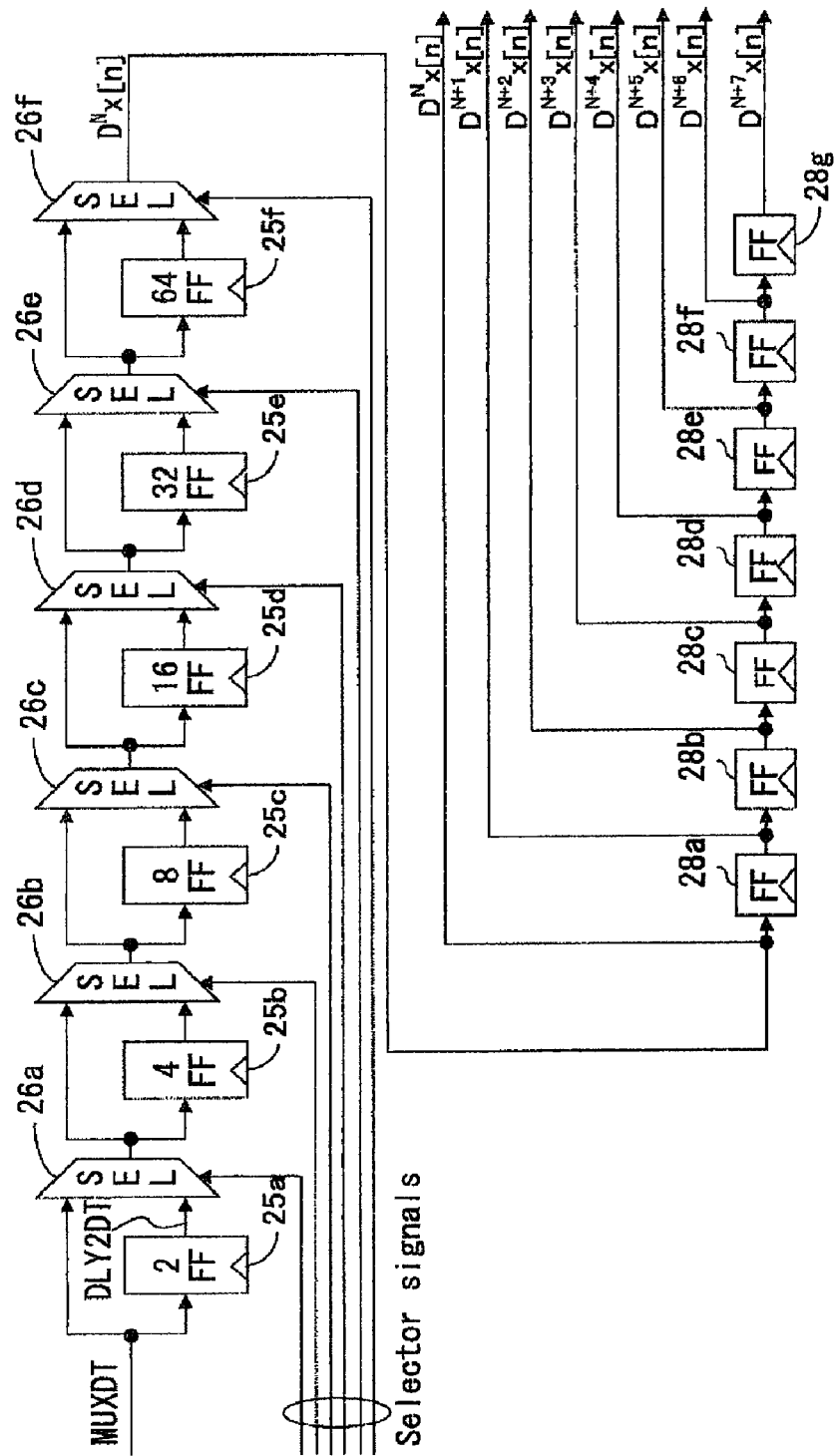
FIG. 11 depicts a configuration block diagram of the reflection data path circuit in FIG. 8.

FIG. 11 is a configuration block diagram of the reflection data path circuit 18 in FIG. 8. In the drawing, the reflection data path circuit 18 is composed of six selectors $26_a$ through $26_f$, six groups $25_a$ through $25_f$ of a plurality of FFs, disposed in the preceding stages of the selectors, and FFs $28_a$ through $28_g$ in seven stages to which output from the selector $26_f$ is input sequentially. Here, for example, 2FF for the FF group $25_a$ and 4FF for $25_b$ represent that two FFs and four FFs are serially coupled, respectively. The similar applies to others such as $8FF25_c$.

Figure 12:
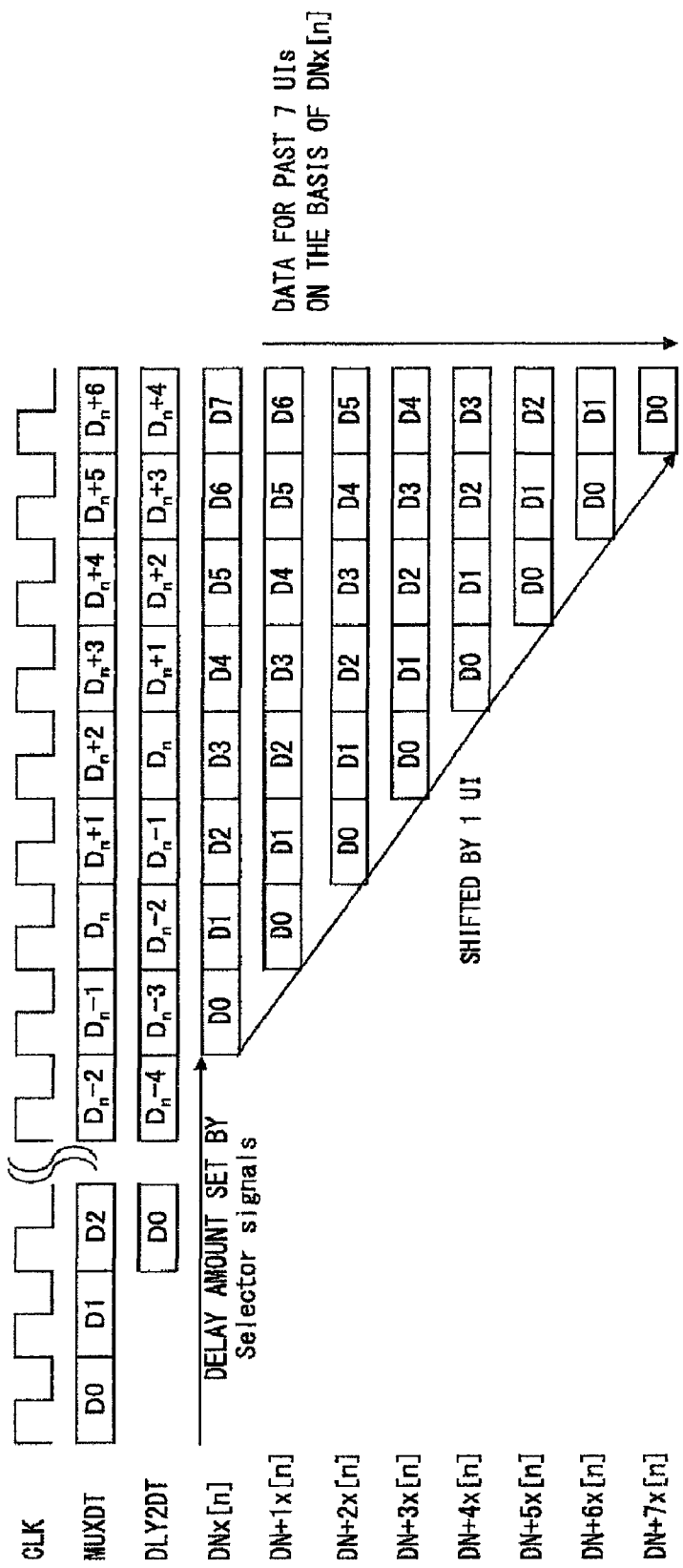
FIG. 12 depicts a timing chart of an operation example of the circuit in FIG. 11.

Selector signals are provided from outside as selection control signals for the respective selectors $26_a$ through $26_f$ in FIG. 11, and the operation of the reflection data path circuit is described using the timing chart in FIG. 12. Data MUXDT output from the multiplexer 15 in FIG. 8 is provided to the selector $26_a$ as a signal DLY2DT with a two-clock delay provided by the 2FF25a. The selectors $26_a$ through $26_f$ select and output either of the two inputs in accordance with the selector signals provided from outside, and the output signal from the selector $26_f$ in the last stage is expressed as $D^Nx[n]$ that corresponds to x[n] as the output data MUXDT from the multiplexor 15 with an N-clock delay, generally.

The output data from the selector $26_f$ is input to the FFs $28_a$ through $28_g$ in seven stages sequentially, and as a result, the reflection data path circuit 18 outputs $D^{N+1}x[n]$ through $D^{N+7}x[n]$ as signals corresponding to the output $D^Nx[n]$ as the output from the selector $26_f$ respectively with one-clock delay. In other words, the reflection data path circuit 18 outputs $D^Nx[n]$ corresponding to the current transmission signal x[n] with an N-clock delay, and data for the past seven UIs on the basis of the signal.

Figure 13:
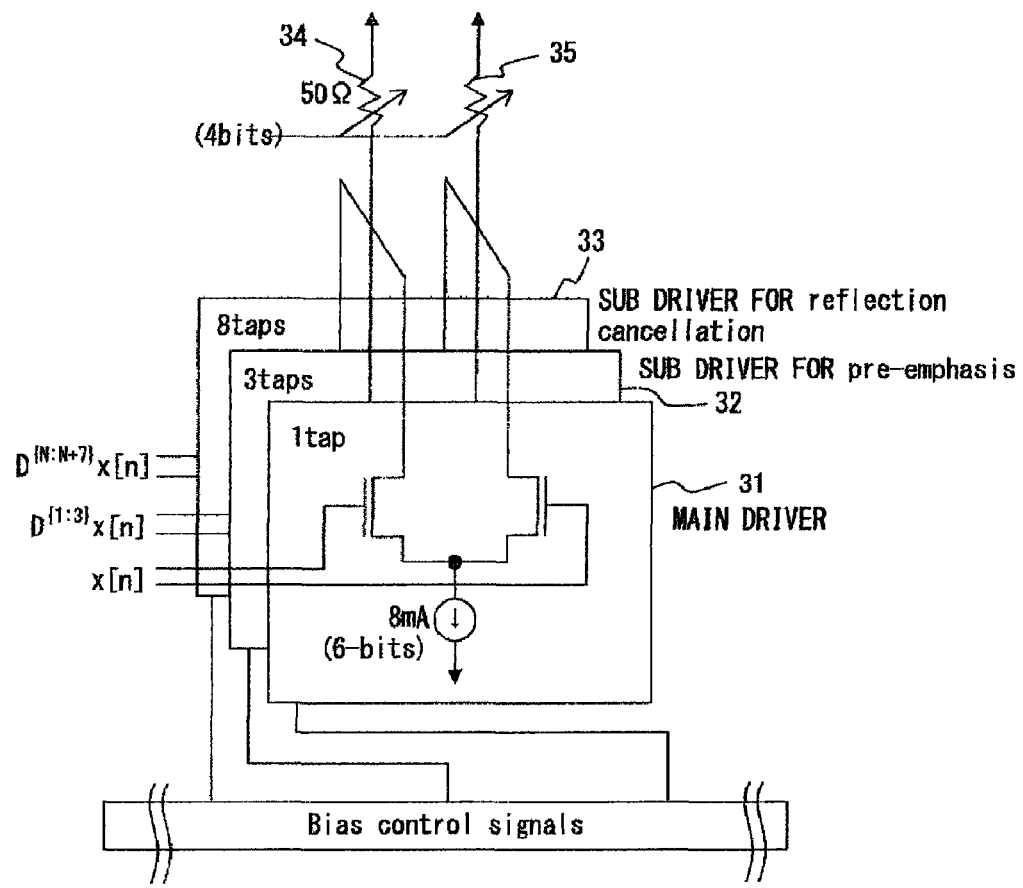
FIG. 13 depicts a circuit configuration diagram of the output driver in FIG. 8.

FIG. 13 is a circuit configuration diagram of the output driver 19 in FIG. 8. In the drawing, the output driver 19 is composed of one main driver 31, three sub drivers 32 for pre-emphasis, eight sub drivers 33 for reflection cancellation, and two resistors 34, 35. The total 12 drives are basically composed of the similar differential amplifier, and the control of the gain for each driver is performed by adjusting the bias current of each driver using bias control signals provided from outside.

In FIG. 13, the main driver 31 is a driver corresponding to the transmission data x[n] of the current time in the output of from the main data path circuit 17 in FIG. 9. and the sub drivers 32 for pre-emphasis, i.e., the three sub drivers 32 are drivers corresponding to data for the past three UIs output from the FFs $22_a$ through $22_c$, and the sub drivers 33 for reflection cancellation, i.e., the eight sub drivers 33 are drivers corresponding to $D^N x[n]$ through $D^{N+7} x[n]$ output from the reflection data path circuit 18 in FIG. 11; the outputs from the total 12 drivers being respectively coupled to the resistors 34 and 35, to perform the addition of the currents. The gain control for each driver corresponds to the adjustment of tap coefficients in the IIR filter.

As described above, according to the first embodiment, in the outputs from the main data path circuit 17, the transmission data of the current time are output through the main drier 31, the data components for realizing the pre-emphasis function is output through the sub drivers 32 for pre-emphasis, and reflection suppression components for eliminating a reflection component due to a discontinuity in the characteristic impedance in a transmission line and a cable are output through the sub drivers 33 for reflection cancellation; respectively from the output driver 19.

Figure 14:
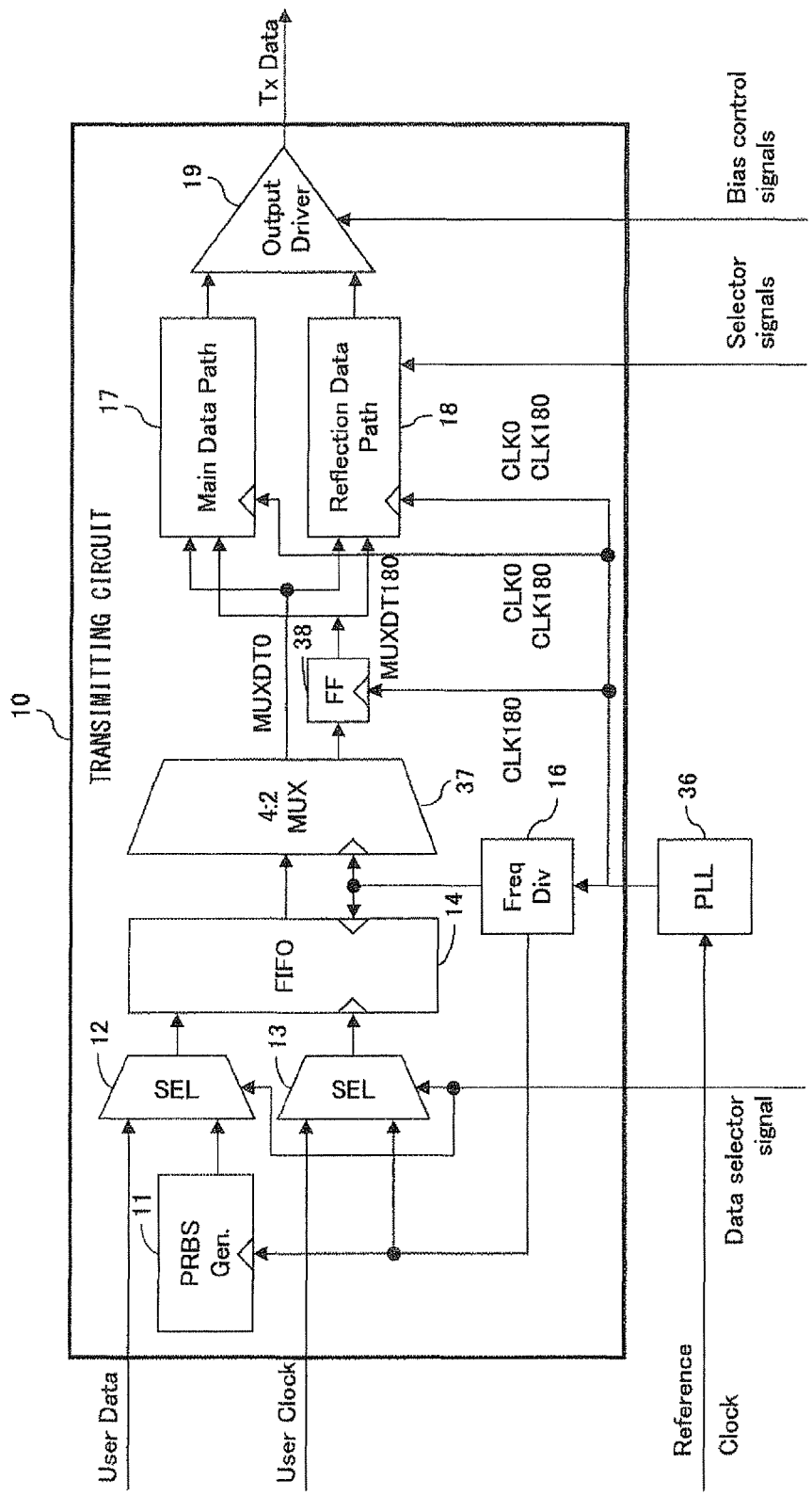
FIG. 14 depicts a configuration block diagram of a transmitting circuit according to the second embodiment.
Figure 18:
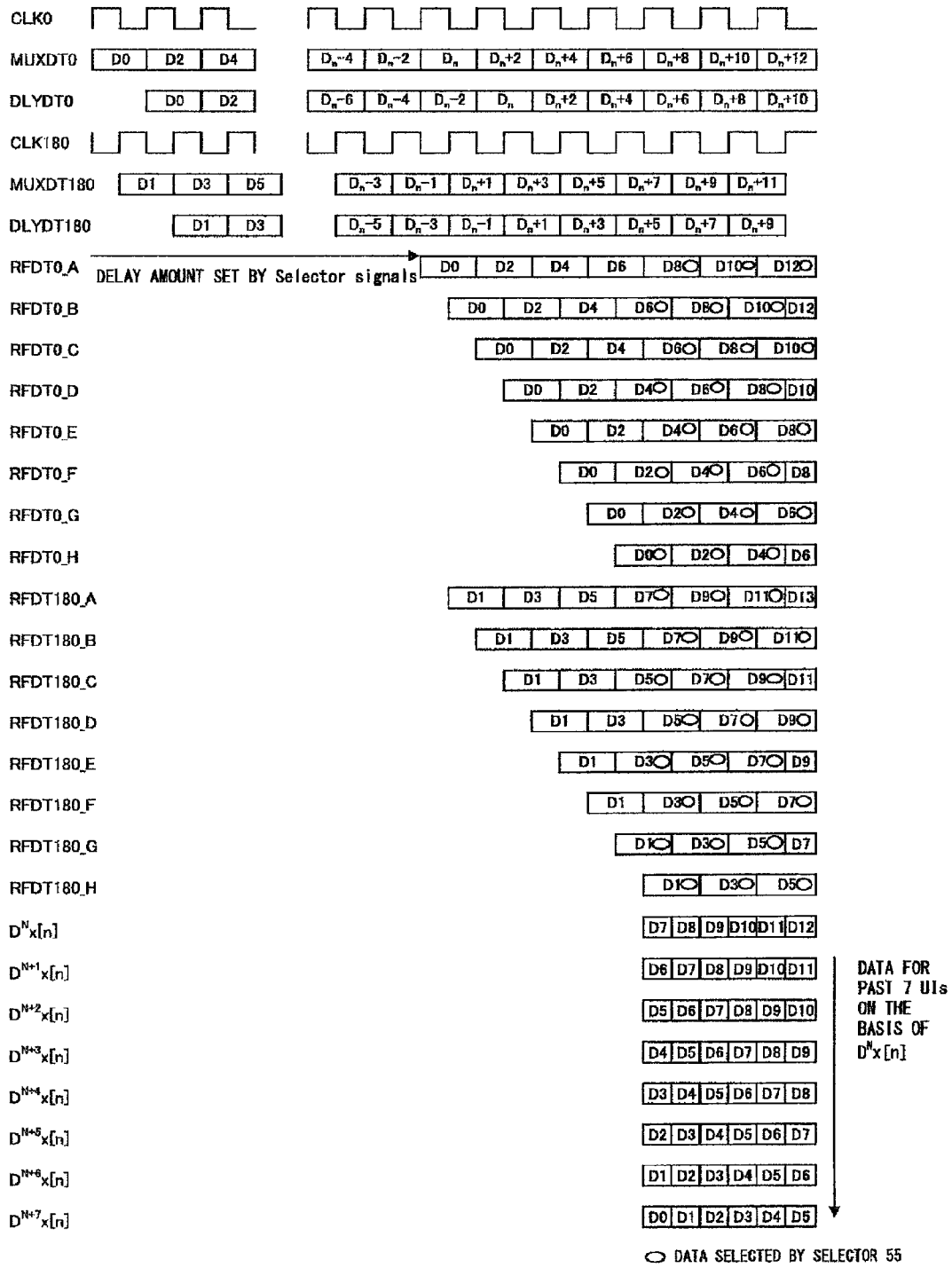
FIG. 18 depicts a timing chart of an operation example of the circuit in FIG. 17.

Next, the second embodiment is described using FIG. 14 trough FIG. 18. The second embodiment is an embodiment for making the actual implement relatively easy; although the circuit size increases, it may be realized easier, by reducing the frequency of the data and clock of an internal signal in the transmitting circuit lower than a frequency corresponding to the data rate of actual transmission data.

FIG. 14 is a configuration block diagram of a transmitting circuit according to the second embodiment. Compare the drawing with FIG. 8 for the first embodiment, the basic difference is that the output of the multiplexer 15 is output to the main data path circuit 17 and the reflection data path circuit 18 at the similar time without change in FIG. 8, whereas in FIG. 14, a multiplexer 37 performs the operation of four inputs and two outputs, and one of the outputs MUXDT0 is provided to the main data path circuit 17 and the reflection data path circuit 18 without change, while the other output is provided to a flip flop 28 that is newly added.

In addition, two-phase clocks having a frequency that is half of 5 GHz in the first embodiment, i.e., 2.5 GHz, are used as clocks to be provided to the main data path circuit 17, the reflection data path circuit 18, and the flip flop 38, as described above. Assuming CLK0 of the two-phase clocks as the positive phase clock, CLK 180 is a clock with a 180-degree shift; and while these two-phase clocks CLK0/CLK180 are provided to the main data path circuit 17 and the reflection data path circuit 18, only the CLK 180 is provided to the flip flop 38.

In addition, in the flip flops being the constituent elements of the main data path circuit 17 and the reflection data path circuit 18 in FIG. 14, two types of flip flops, i.e., a flip flop that takes in input data in synchronization with the rising edge of a clock, and a flip flop that takes in input data in synchronization with the falling edge of a clock are used, representing a difference over the first embodiment in which all flip flops take in data at the rising edge of a clock, of which details are described later.

Figure 15:
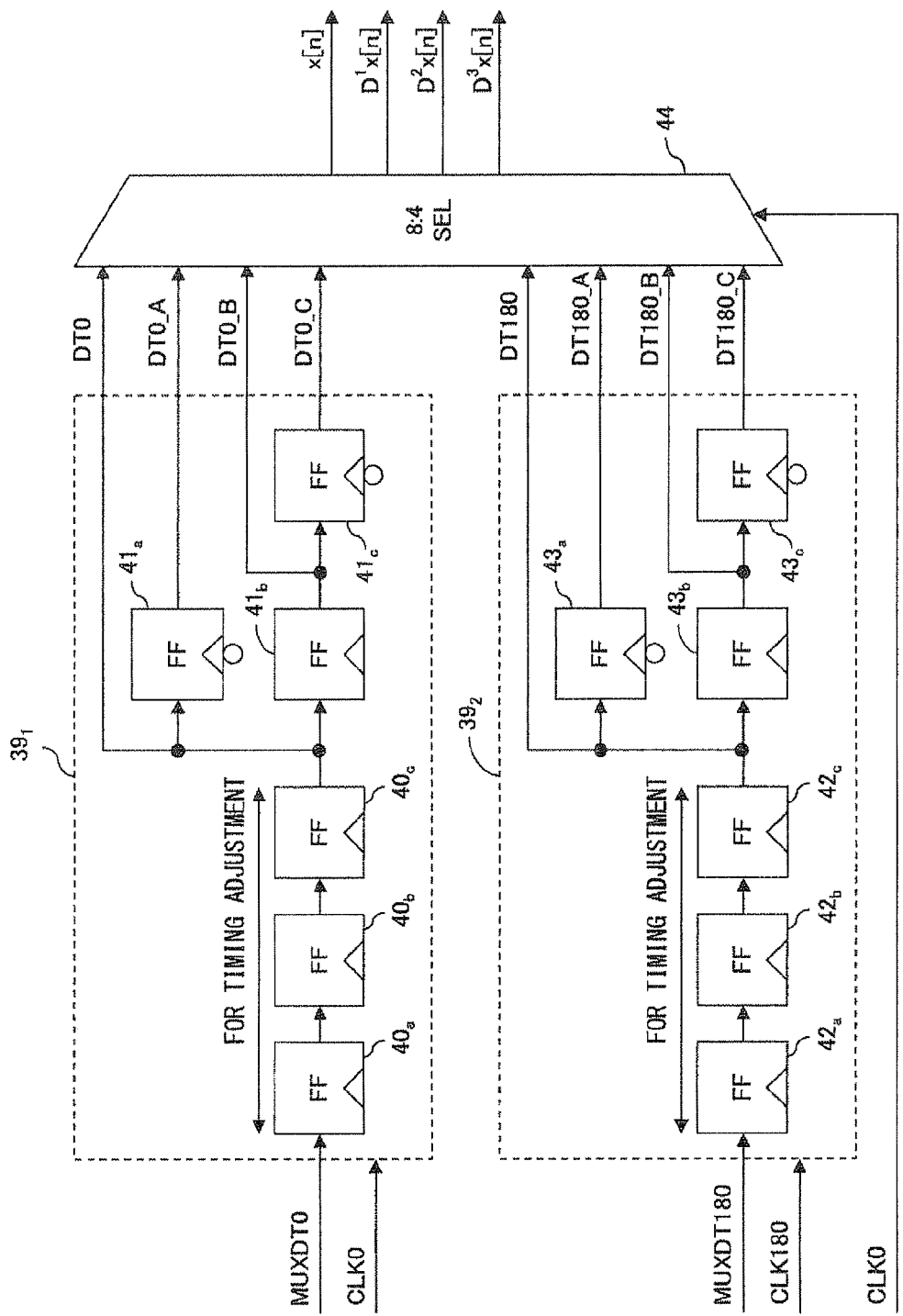
FIG. 15 depicts a configuration block diagram of the main data path circuit in FIG. 14.

FIG. 15 is a configuration block diagram of the main data path circuit 17 in the transmitting circuit in FIG. 14. As described for FIG. 14, one of the outputs from the multiplexer 37 MUXDT0 and MUXDT180 as the output from the flip flop 38, as well as the clocks CLK0 and CLK 180 as clock signals are input to the main data path circuit 17.

The main data path circuit 17 is composed of two FF groups $39_1$, $39_2$ respectively composed of six flip flops, and a 8-input 4-output selector 44. The FF group $39_1$ is composed of serially-coupled three FFs $40_a$ through $40_c$ for timing adjustment, and three FFs $41_a$ through $41_c$ in the subsequent stage. The three FFs $40_a$ through $40_c$ for timing adjustment correspond to three FFs inserted as FFs required for the implementation in a detail configuration of the reflection data path circuit 18, for matching the timing of the output data, for example.

Of the three FFs $41_a$ through $41_c$ in the subsequent stage in the subsequent stage, the two FFs $41_a$ and $41_c$ are FFs that take in input data at a falling edge of a clock, i.e., FFs that operate in accordance with a negative logic, while the FF$41_b$ and the three FFs $40_a$ through $40_c$ for timing adjustment are all FFs that take in input data at the rising edge of a clock. Meanwhile, CLK0 of the two-phase clocks are provided to the FF group $39_1$ and the selector 44, and the reverse-phase CLK180 is provided to the FF group $39_2$, as a clock signal.

Figure 1:
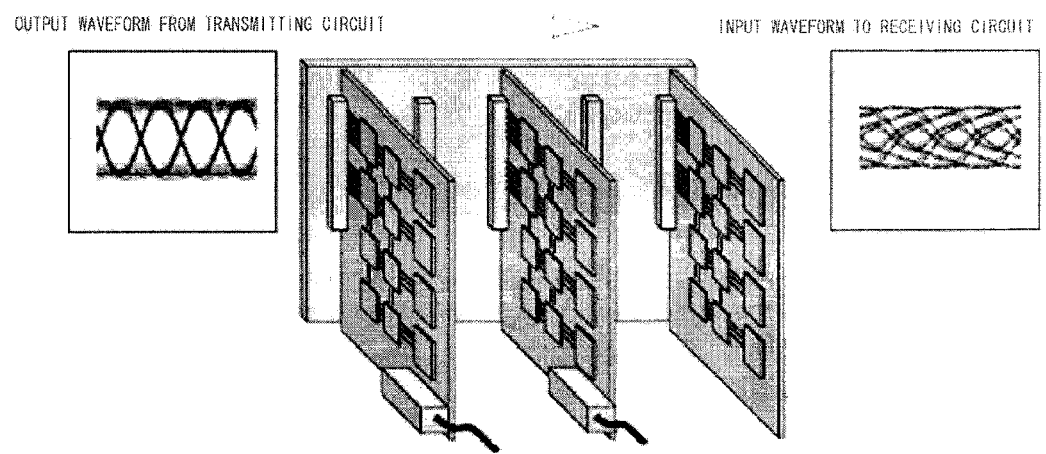
FIG. 1 depicts a data transmission/reception system through a backplane.
Figure 2:
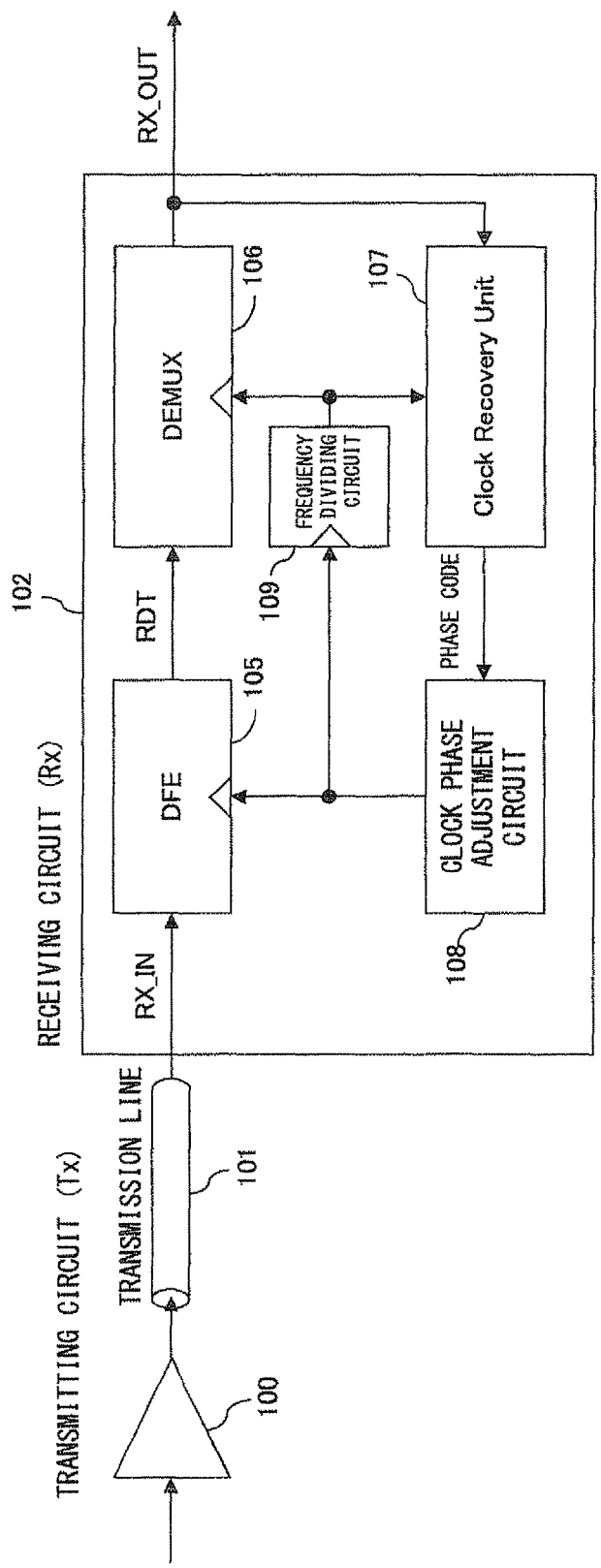
FIG. 2 depicts a conventional example of a receiving circuit.
Figure 3:
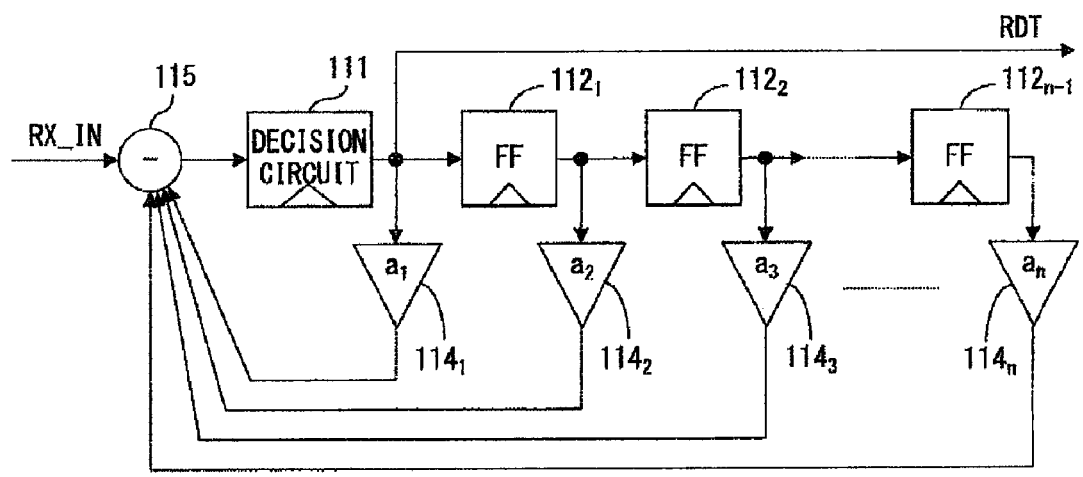
FIG. 3 depicts a configuration example of the decision feedback equalizer in FIG. 2.
Figure 4:
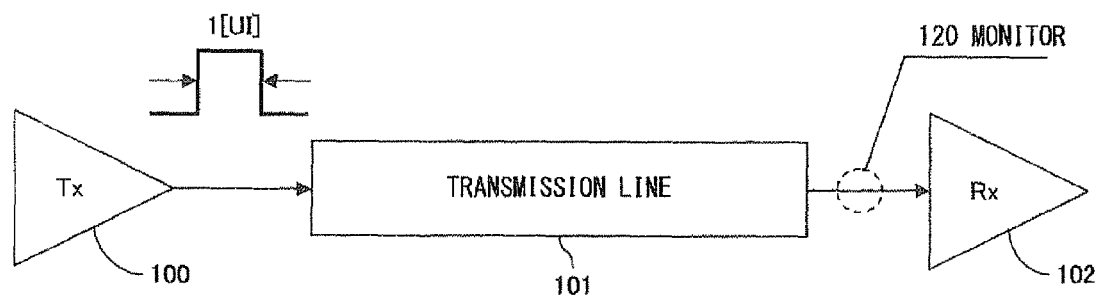
FIG. 4 depicts a pulse response measurement system in a transmission line.
Figure 16:
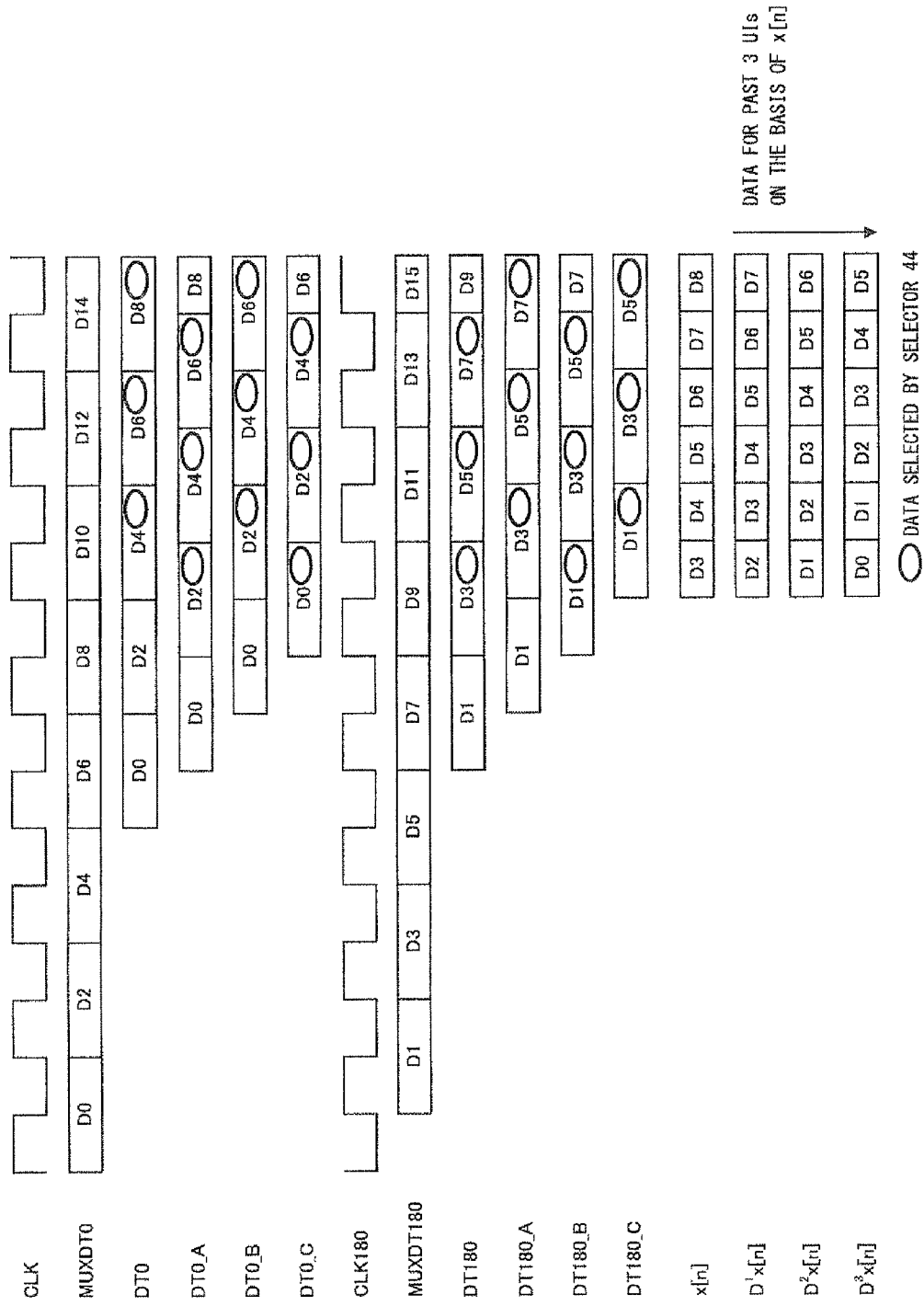
FIG. 16 depicts a timing chart of an operation example of the circuit in FIG. 15.

The operation of the main data path circuit 17 in FIG. 15 is described using the timing chart in FIG. 16. As described above, MUXDT0 is provided to the FF $39_1$ as input data; every other data D0, D2, D4 output from the multiplexer 37 in FIG. 4 are shifted sequentially in the three FFs $40_a$ through $40_c$ for timing adjustment; and the first data D0 is provided to the selector 44 as data DT0, in the fourth cycle of the positive phase clock CLK0 of the two-phase clocks.

The data DT0 is also input to the two FFs $41_a$ and $41_b$, the FF$41_a$ operating in accordance with a negative logic, and is taken by the FF$41_a$ at the falling edge of the clock CLK0, and is provided to the selector 44 as data DT0_A. Meanwhile, the data D0 input to the FF$41_b$ is taken by the FF $41_b$ at the rising edge in the fifth cycle of the clock CLK0, and is output to the selector 44 as data DT0_B. The data is also input to the FF$41_c$ at the similar time, taken at the falling edge in the fifth cycle of the clock CLK0, and is input to the selector 44 as data DT0_C. Explanation for the shift in the FFs and output operation to the selector 44 for the subsequent data D2 and beyond is omitted, as they are performed in the similar manner.

Meanwhile, data MUXDT180 input to the FF group $39_2$ is output from the FF38 as described for FIG. 14; and the FF 38 takes in every other data D1, D3, D5 . . . output from the multiplexer 37 at the rising edge of the reverse-phase clock CLK 180 of the two-phase clocks; the taken data are shifted sequentially in the three FFs $42_a$ through $42_c$ for timing adjustment; and the first data D1 is output to the selector 44 as DT180, in the fourth cycle of the reverse-phase clock CLK180 of the two-phase clocks. Explanation for the subsequent operations is omitted, as they are the similar for the FF group $39_1$.

The first output timing of the data from the selector 44 is the rising edge in the sixth cycle of the positive-phase clock CLK0. From this timing, the data held be the six FFs $41_a$ through $41_c$ and $43_a$ through $43_c$ are output, and at the first timing, data D3 output from the FF $42_c$ as the output data x[n] of the current data, D2 output from the FF$41_a$ as data $D^1 x[n]$ with a one clock-period delay, data D1 output from the FF $43_b$ as $D^2 x[n]$ with a two clock-period delay, and data D0 output from the FF $41_c$ as $D^3 x[n]$ with a three clock-period delay are output. Thus, the current output data x[n] and the data for the past three UIs on the basis of x[n] are output.

Figure 17:
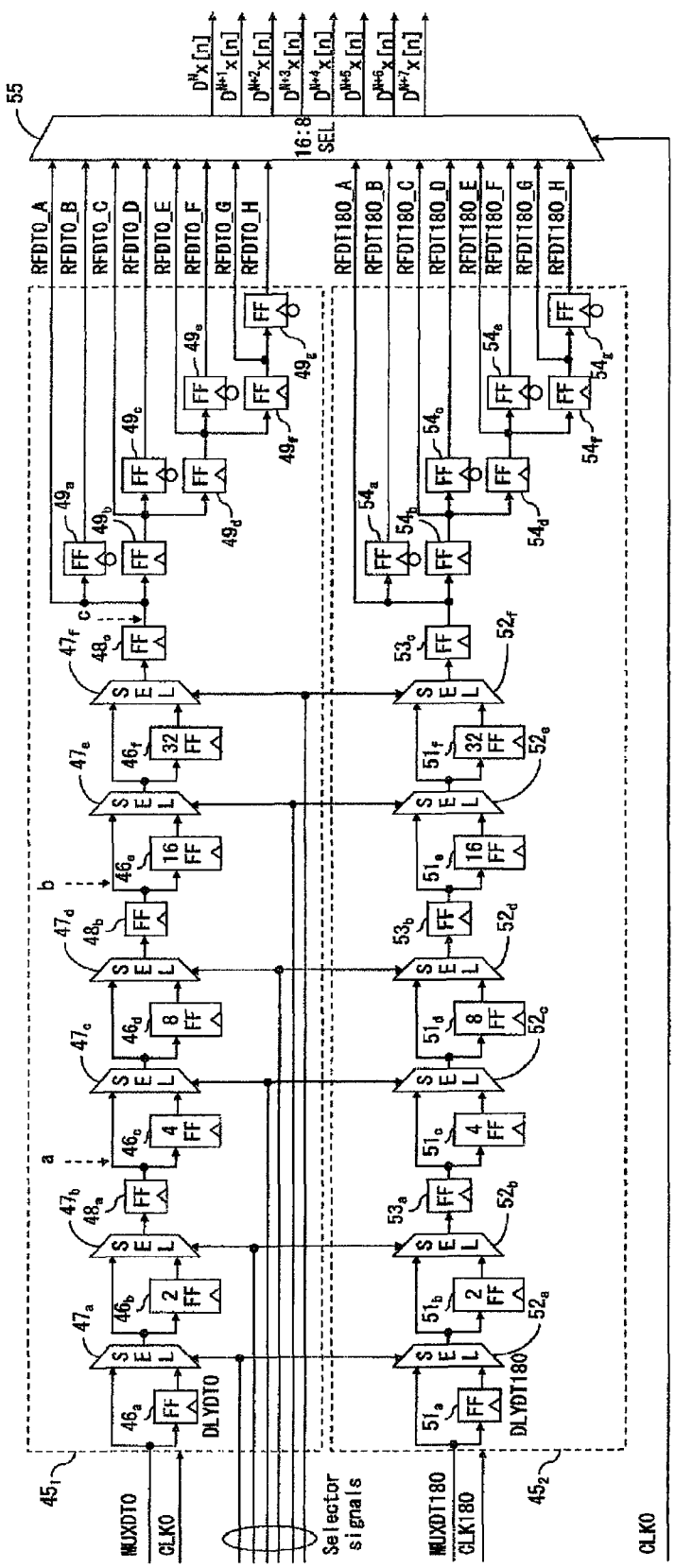
FIG. 17 depicts a configuration block diagram of the reflection data path circuit in FIG. 14.

FIG. 17 is a detail circuit configuration diagram of the reflection data path circuit 18 in FIG. 14. In the drawing, the reflection data path circuit is composed of, in the similar manner as the main data path circuit in FIG. 15, a circuit block $45_1$ to which the output data MUXDT0 from the selector 37 and a positive-phase clock CLK0 in FIG. 14 are provided, a circuit block $45_2$ to which MUXDT180 as the output from the FF 38 and a negative-phase clock CLK180 are provided, and a 16-input 8-output selector 55 to which the positive-phase clock CLK 0 is provided as a clock signal.

In FIG. 17, the part including six FF groups $46_a$ through $46_f$ respectively composed of one or more FFs at the input side of the circuit block $45_1$, and selectors $47_a$ through $47_f$ in six stages is partly similar to the configuration of the input side of FIG. 11 corresponding to the first embodiment. In addition, the configuration of six FFs $49_a$ through $49_g$ at the output side is similar to the configuration of, for example, the three FFs $41_a$ through $41_c$ in the main data path circuit 17 in FIG. 15.

As an apparently different configuration, three FFs $48_a$ through $48_c$ are respectively added after the selectors coupled in two stages. The three FFs are inserted for convenience of implementation. Within the circuit block $45_1$, assuming data transfer paths from a point a and point c for example, the case where four selectors $47_c$ through $47_f$ in the transfer path all selects the upper data path is considered. At this time, if FFs $48_b$ and $48_c$ do not exist, data transfer from the point a to the point c needs to be performed within one clock cycle. Here, the data path is composed of four selectors, and the performance needs to be made through a combination logic circuit coupled in series with respect to the data path, and when the number of such combination logic circuits increases, it may be impossible to transfer data from the point a to the point c within one clock cycle. Therefore, the FFs $48_a$ through $48_c$ for timing adjustment are inserted for the respective two stages of the selectors. In other words, the FFs $48_a$ through $48_c$ correspond to, for example, the three FFs $40_a$ through $40_c$ in the FF group $39_1$. While the FFs for timing adjustment are inserted for the respective two stages of the selectors here, this of course depends on the implementation technology.

In FIG. 17, the two circuit blocks $45_1$, $45_2$ are disposed in the similar manner as the main data path circuit 17 in FIG. 15, and the numbers of FFs constituting the six FF groups $46_a$ through $46_f$ that are composed of one or more FFs are respectively half of the numbers of the FFs in each of the six FF groups $25_a$ through $25_f$ in FIG. 11. In addition, while not depicted in the drawing, regarding the FFs constituting the five FF groups $46_b$ through $46_f$, half of the FFs in each of the FF group operate in accordance with a positive logic, and the remaining half operate in accordance with a negative logic, in the form in which one positive-logic FF and one negative-logic FF are coupled alternately, like the two FFs $41_b$ and $41_c$ in FIG. 15.

The operation of the reflection data path circuit 18 in FIG. 17 is described using the timing chart in FIG. 18. In FIG. 17, for example, the delay time between the input to the circuit block $45_1$ and the output from the FF$48_c$ of data MUXDT0 is determined, in the similar manner as in FIG. 11 for the first embodiment, by selection control signals provided to each of the selectors $47_a$ through $47_f$, i.e., selector signals. Here, the delay time is assumed to be N clock cycles for the two circuit blocks $45_1$ and $45_2$ together, in the similar manner as in FIG. 11 corresponding to the first embodiment.

For example, data D0 taken first by the FF$48_c$ in the block $45_1$ is output to the selector 55 as data RFDT0_A. The data is input to the FF $49_a$ at the similar time, and is output from FF $49_a$ as RFDT0_B at the falling edge of a clock, i.e., after a half clock cycle. Detail explanation of the subsequent operations is omitted, as they are the similar as in FIG. 16.

Similar operations are performed at the circuit block $45_2$ side. To the circuit block $45_2$, in the similar manner as for the FF group $39_2$ in FIG. 15, data MUXDT180 output from the FF 38 in FIG. 14, and a reverse-phase clock CLK180 as a clock are provided; after the delay time determined by the selector signal provided from outside, the first input data D1 is output from FF $53_c$ to the selector 55 as data RFDT180_A, and is output from the FF $54_a$ to the selector 55 as RFDT180_B after a half clock cycle.

In the similar manner as in FIG. 16, at the time when eight pieces of data are provided to the selector 55 from each of the two circuit blocks $45_1$, $45_2$, the selector 55 selects eight pieces out of the 16 pieces of data in synchronization of the rising edge of the clock CLK0, and output to the output driver 19 in the subsequent stage. The eight pieces of data output first include D7 corresponding to $D^Nx[n]$, and D6 through D0 that are data for the past seven UIs on the basis of $D^Nx[n]$.

Explanation of the configuration of the output driver 19 in the subsequent stage of the main data path circuit 17 and the reflection data path circuit 18 is omitted as it is the similar as in FIG. 13 for the first embodiment.

Figure 19:
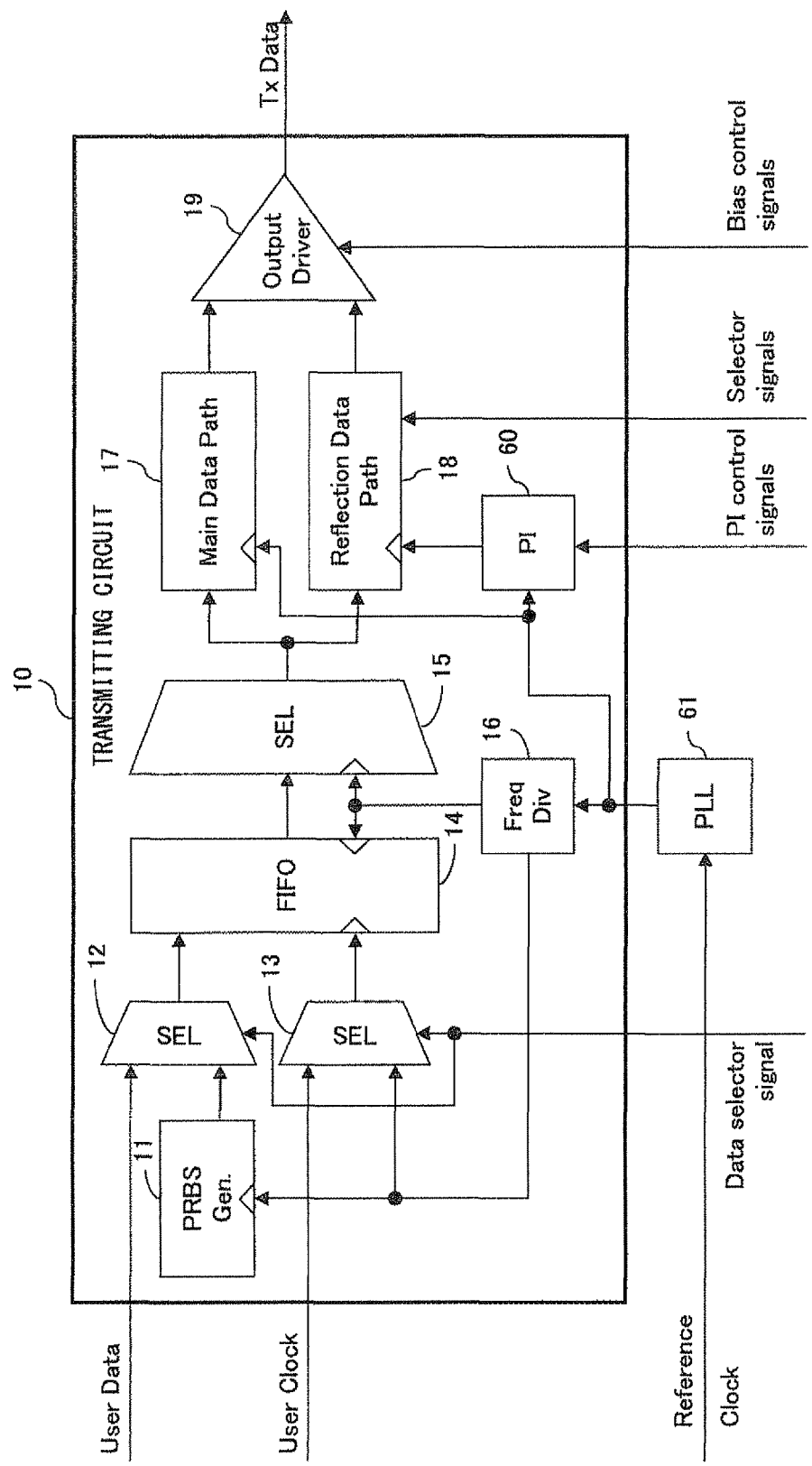
FIG. 19 depicts a configuration block diagram of a transmitting circuit according to the third embodiment.

FIG. 19 is a configuration block diagram of a transmitting circuit according to the third embodiment. In the third embodiment, in order to suppress the reflection from the point of discontinuity in the characteristic impedance in a transmission line and a cable more efficiently than, for example, in the first embodiment, a phase interpolator (PI) 60 is added in addition to the configuration in FIG. 8, for the purpose of enabling the fine adjustment of the output timing of the reflection suppression component output from the reflection data path circuit.

Figure 5:
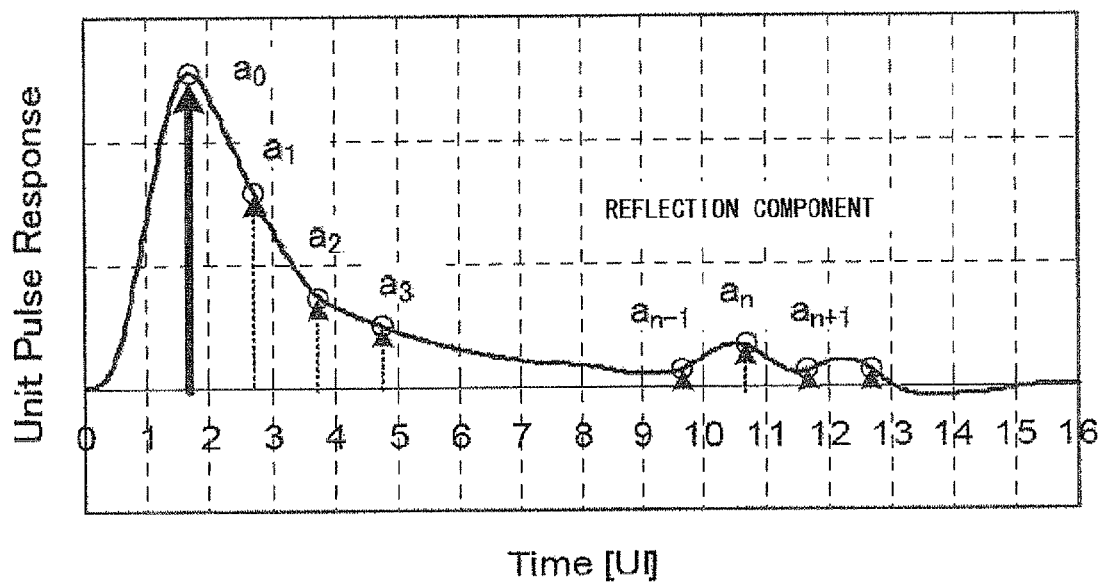
FIG. 5 depicts an example of a pulse response waveform with the use of the system in FIG. 4.

In other words, as described for FIG. 5, the reflection component from the transmission line 101 is delayed in terms of time with respect to the original output data, i.e., the peak position $a_0$, the delay depending on the length and the like of the transmission line and the cable. Therefore, the reflection suppression may be performed more effectively, by matching the output timing of the data component for the reflection suppression output from the reflection data path circuit 18 with the position of the reflection component in terms of time.

In the third embodiment in FIG. 19, a PLL circuit 61 outside the transmitting circuit supplies, to the transmitting circuit, four-phase clocks: a 90-degree phase clock shifted by 90 degrees with respect to the positive-phase clock, a 270-degree phase clock shifted by 270 degrees with respect to the positive-phase clock, in addition to the positive-phase clock, i.e., a 0-degree phase clock and the reverse-phase clock, i.e., a 180-degree phase clock described in the second embodiment.

In the transmitting circuit, of the four-phase clocks in, the 0-degree phase clock is provided to the main data path circuit 17 in the similar manner as in FIG. 8 for the first embodiment, a clock output from the PI 60 is provided to the reflection data path circuit 18. The PI 60 generates a clock in an arbitrary phase by interpolation, in accordance with the input of the four-phase clocks, and the fine adjustment of the output phase, i.e., the output timing of the data component for the reflection suppression is performed by supplying the clock to the reflection data path circuit 18, realizing the reflection suppression with higher accuracy.

Finally, effects of the embodiments are described using FIG. 20 and FIG. 21. These drawings are data eye-pattern waveforms obtained at the position of the monitor at the input side of the receiving circuit (Rx) 102 in FIG. 4 using the data transfer rate of 5 Gb/s, corresponding to the second embodiment described above. The examples of the waveforms are for the case where an end resistance that is different from the original characteristic impedance 50Ω of the transmission line is coupled to the position of the monitor in FIG. 4, so that the reflection component from the transmission line side arrives at the transmitting circuit side.

The value of the termination resistance in FIG. 20 is 22Ω, the example of the waveforms being for the cases where a) neither of the main data path circuit, i.e., the pre-emphasis function and the reflection data path circuit, i.e., the reflection suppression function is used, b) only the pre-emphasis function is activated, and c) both the pre-emphasis function and the reflection suppression function are activated. FIG. 21 illustrates the waveform in the case where the value of the termination resistance is 200Ω, and it has been found that using either of the termination resistances, the reflection suppression may be performed effectively, by disposing the IIR filter at the transmitting circuit side.

Aforementioned embodiments relate to a data transmitting circuit and a transmitting method in various data transmission/reception systems.

Aforementioned embodiments may be applied to, for example, systems for data reception/transmission between LSIs, data transmission/reception between a plurality of elements and circuit blocks in a chip, or data reception/transmission between boards and between cases.

According to aforementioned embodiments, it may be possible to suppress a reflection component caused by a discontinuity in the characteristic impedance in a transmission line and a cable accurately, by the formation of an IIR filter with the reflection suppression component generating circuit, an amplification circuit and an adder circuit being a part within the data transmitting circuit.

Numbers applying embodiments (first, second or third etc.) do not show priorities of the embodiments. Many variations and modifications will be apparent to those skilled in the art.

All examples and conditional language recited herein are intended for pedagogical purposes to aid the reader in understanding the invention and the concepts contributed by the inventor to furthering the art, and are to be constructed as being without limitation to such specifically recited examples and condition, nor does the organization of such examples in the specification relate to a showing of the superiority and inferiority of the invention. Although the embodiments of the inventions have been described in detail, it should be understood that the various changes, substitutions, and alterations could be made hereto without departing from the spirit and scope of the invention.

What is claimed is:

1. A transmitting circuit comprising:
   a reflection suppression component generating circuit generating a reflection suppression component for suppressing a reflection caused by a discontinuity in a characteristic impedance existing in a transmission line coupled to the transmitting circuit; and
   a data output circuit amplifying and outputting, to the transmission line, the reflection suppression component and data to be transmitted to a receiving side coupled to the transmission line,
   wherein the data output circuit includes:
      a first amplifier circuit amplifying the data to be transmitted;
      a second amplifier circuit amplifying the reflection suppression component; and
      an adder circuit adding and transmitting, to the transmission line, outputs of the first amplifier circuit and the second amplifier circuit.

2. The data transmitting circuit according to claim 1, wherein the reflection suppression component generating circuit, the first amplifier circuit, the second amplifier circuit and the adder circuit are included in an IIR filter.

3. The data transmitting circuit according to claim 1, wherein the reflection suppression component generating circuit generates the reflection suppression component by delaying transmission data previous to the data to be transmitted at the current moment.

4. The data transmitting circuit according to claim 3, wherein the transmitting circuit further comprises a clock signal phase adjustment circuit adjusting a phase of, and providing, to the reflection suppression component generating circuit, a clock signal for the reflection component generating circuit to delay previous transmission data.

5. A transmitting circuit comprising:
   a reflection suppression component generating circuit generating a reflection suppression component for suppressing a reflection caused by a discontinuity in a characteristic impedance existing in a transmission line coupled to the transmitting circuit; and
   a data output circuit amplifying and outputting, to the transmission line, the reflection suppression component and data to be transmitted to a receiving side coupled to the transmission line,
   wherein the transmitting circuit further comprises a pre-emphasis component generating circuit generating and outputting, with the transmission data to be transmitted to the receiving side at the current moment, to the data output circuit, a pre-emphasis component for suppressing an inter-symbol interference caused by a loss in the transmission line, and the data output circuit further amplifies and output, to the transmission line, the pre-emphasis component.

6. A method of transmitting data, the method comprising:
   generating a reflection suppression component for suppressing a reflection caused by a discontinuity in a characteristic impedance existing in a transmission line;
   amplifying the data to be transmitted;
   amplifying the reflection suppression component; and
   adding and transmitting, to the transmission line, the amplified data and the amplified reflection suppression component.

7. A method of transmitting data, the method comprising:
   generating a reflection suppression component for suppressing a reflection caused by a discontinuity in a characteristic impedance existing in a transmission line and a pre-emphasis component for suppressing an inter-symbol interference caused by a loss in the transmission line, and
   amplifying and outputting, to the transmission line, the reflection suppression component, the pre-emphasis component and data to be transmitted to a receiving side.

* * * * *